United States Patent [19]

Bachot et al.

[11] Patent Number: 5,023,127

[45] Date of Patent: Jun. 11, 1991

[54] MICROPOROUS COMPOSITES AND ELECTROLYTIC APPLICATIONS THEREOF

[75] Inventors: Jean Bachot, Bourg La Reine; Jean-Claude Kiefer, Blaincourt Les Precy, both of France

[73] Assignee: Rhone-Poulenc Chimie De Base, Courbevoie, France

[21] Appl. No.: 486,428

[22] Filed: Feb. 28, 1990

Related U.S. Application Data

[62] Division of Ser. No. 892,432, Aug. 4, 1986, Pat. No. 4,939,028.

[30] Foreign Application Priority Data

Aug. 2, 1985 [FR] France ................................. 85 11857

[51] Int. Cl.⁵ .............................................. B32B 3/10
[52] U.S. Cl. ................................ 428/137; 162/157.1; 162/138; 162/168.1; 204/180.2; 204/181.7; 204/284; 204/294; 428/131; 428/288; 428/304.4; 428/315.5; 428/297; 428/408

[58] Field of Search ............... 428/131, 137, 288, 297, 428/408, 304.4, 315.5; 162/157.1, 138, 168.1; 204/180.2, 181.7, 284, 294

[56] References Cited

U.S. PATENT DOCUMENTS 4,939,028 7/1990 Bachot et al. ................... 428/311.1

*Primary Examiner*—James J. Bell
*Attorney, Agent, or Firm*—Burns, Doane, Swecker & Mathis

[57] ABSTRACT

Microporous composites adopted for electrolytic applications, e.g., as cathodes in the electrolysis of sodium chloride, are comprised of a regular, homogeneous and consolidated microporous deposit of monodispersed carbon fibers on a perforated rigid support substrate therefor, said carbon fibers having a distribution by length such that the mean length of at least 80% of the individual fibers, plus or minus 20%, corresponds to the mean length of said fibers.

11 Claims, No Drawings

MICROPOROUS COMPOSITES AND ELECTROLYTIC APPLICATIONS THEREOF

This application is a division of application Ser. No. 06/892,432, filed Aug. 4, 1986 now U.S. Pat. No. 4,939,028.

SUMMARY OF THE INVENTION

It has now surprisingly been found, and this constitutes a major object of the present invention, that such carbon fibers, used under specific conditions, provide an altogether new and unexpected function which relates to the structural characteristics of the microporous material, independent of their conducting property.

Briefly, the present invention features microporous materials which are comprised of carbon fibers characterized by a monodisperse distribution of fiber lengths.

By "monodisperse" distribution as utilized herein, there is intended a distribution of fiber lengths such that the length of at least 80%, and advantageously 90%, of the fibers corresponds to that of the mean length of fibers within ±20%, and advantageously within ±10%.

DETAILED DESCRIPTION OF THE PREFERRED EMBODIMENTS OF THE INVENTION

More particularly according to the present invention, the subject carbon fibers are advantageously in the form of filaments, the diameters of which are less than 1 mm, preferably ranging from $10^{-5}$ to 0.1 mm, and the lengths of which are greater than 0.1 mm, preferably ranging from 1 to 20 mm, and said fibers having a resistivity equal to or less than 0.4 ohm.cm.

In a preferred embodiment of the invention, the lengths of the fibers do not exceed the diameters of the perforations in the perforated rigid substrate onto which the fibrous layer is deposited.

Thus, the microporous material according to this invention comprises:

(i) a perforated, rigid support substrate which may define an elementary cathode having one or more planar face surfaces, or face surfaces in the form of cylinders deemed "glove fingers", thus providing an open surface; and (ii) a fibrous structure deposited therein which comprises the carbon fibers according to the invention, if required in combination with other fibers such as asbestos fibers, advantageously consolidated with binders such as polymeric binders, themselves advantageously comprised of fluorinated polymers.

Consistent herewith, by the expression "fluorinated polymer" is intended a homopolymer or a copolymer, derived at least in part from olefinic monomers substituted with fluorine atoms, or substituted with a combination of fluorine atoms and at least one chlorine, bromine or iodine atom per monomer.

Exemplary of such fluorinated homopolymers or copolymers, representative are the polymers and copolymers derived from tetrafluoroethylene, hexafluoropropylene, chlorotrifluoroethylene or bromotrifluoroethylene.

Such fluorinated polymers may also comprise up to 75% (in mols) of recurring units derived from other ethylenically unsaturated monomers containing at least as many fluorine atoms as carbon atoms, such as, for example, vinylidene difluoride, vinyl and perfluoroalkyl esters, such as perfluoroalkoxyethylenes.

Of course, more than one fluorinated homopolymer or copolymer as defined above may be used according to the invention. Likewise, a small amount, for example, up to 10 to 15% by weight, of polymers containing no fluorine atoms in their molecular structure, such as, for example, polypropylene, may be combined with the aforesaid fluorinated polymers without departing from the scope of the invention.

The fluorinated polymer may constitute up to 60% of the total weight of the deposited layer, typically from 5 to 50% of the total weight. The fluorinated polymer according to the invention is advantageously in the form of an aqueous dispersion (latex) containing, in general, from 30 to 70% of the dry polymer, the particle size of which preferably ranging from 0.1 to 5 μm, and more preferably from 0.1 to 1 μm.

A fluorinated polymer in the form of a dry powder, or in fibrous form, may be used without departing from the scope of the present invention.

The present invention also features a process for the preparation of a microporous material by depositing a suspension containing the binder, the fibers and, if required, a pore-forming agent, onto a perforated rigid substrate, and, where appropriate, the pore-forming agent is then removed. The fibers in suspension include the characteristic carbon fibers of monodisperse length distribution.

Unexpectedly, it has been determined that an excellent level of fiber stoppage could be achieved, on the one hand, but that this level of stoppage, or fiber arrest, decreased gradually, and not abruptly, when nearing the shorter lengths of fibers, on the other.

This determination is of considerable practical value.

In fact, it is then possible not only to prepare microporous materials displaying high performance at small thicknesses, but also to recycle the suspension as such, as no deleterious variations are detected in the mean length of the fibers in the recycled suspension.

In order to further illustrate the present invention and the advantages thereof, the following specific examples are given, it being understood that same are intended only as illustrative and in nowise limitative.

EXAMPLES 1 TO 5

Deposition of graphite fibers having a polydisperse distribution of fiber lengths (A) Preparation of the suspension

| | | | |
|---|---|---|---|
| (i) | Softened H$_2$O | 7,000 g | |
| (ii) | Short chrysotile asbestos fibers having lengths ranging from 1 to 5 mm | 37 g | Added together under rotary stirring for 30 min |
| (iii) | Ground graphite wadding | 63 g | |
| (iv) | Sodium dioctylsulfosuccinate (65% strength aqueous solution) | 1 g | |
| (v) | Polytetrafluoroethylene (PTFE) in the form of a 60% solids content latex | 60 g | |

(B) Deposition onto a "glove finger" type grid

After being permitted to stand for 48 hours, the suspension was stirred again before filtration through an elementary cathode consisting of a braided and laminated iron grid—diameter of wires, 2 mm; aperture size, 2 mm—in the form of a "glove finger".

The suspension was filtered according to the following vacuum cycle: immersion for 1 min, followed by successive stages of increasing vacuum (in steps of 2,000 pa) for 1 min.

The composite material resulting from such filtration was then consolidated by drying at 100° C., followed by fusion at 350° C. for 7 to 10 min.

(C) Effect of the length of the graphite fibers

The level of stoppage of the solids in suspension (fibers/polymer) on the cathodes during the filtration essentially depended on the mean length of the fibers and the distribution of the fiber lengths.

As is reported in the following Table I, the level of stoppage is from 80 to 90%, followed by a rapid decrease due to the formation of holes and uncovered areas or zones when the mean fiber length decreases significantly:

TABLE I

| | GROUND GRAPHITE WADDING | | | | | | | Level of Stoppage (%) | Quality of the resulting deposit |
|---|---|---|---|---|---|---|---|---|---|
| | Mean | Distribution of fiber lengths | | | | | | | |
| Example | Length mm | <0.5 mm | 0.5–1 mm | 1–1.5 mm | 1.5–2 mm | 2–2.5 mm | 2.5–3 mm | >3 mm | | |
| 1 | ≈3 | | | 15 | | 10 | 25 | 50 | 84 | unacceptable |
| 2 | ≈2.5 | | 10 | | 10 | 35 | 30 | 15 | 87 | acceptable |
| 3 | ≈2 | 9 | | 15 | 30 | 35 | 10 | <1 | 81 | homogeneous |
| 4 | ≈1.5 | 5 | 20 | 30 | 35 | 10 | 2 | — | 42 | uncovered zone |
| 5 | ≈1 | 15 | 35 | 45 | 8 | <1 | — | — | — | practically no deposition |

The level of stoppage was good for lengths ≧ 2 mm. However, when the mean fiber length increased significantly, the quality of the suspension and the deposit deteriorates quickly. In all cases, the decrease in the level of stoppage was sudden as soon as the mean fiber length was < 2 mm.

EXAMPLES 6 TO 11

Deposition of graphite fibers having a monodisperse distribution of fiber lengths The suspensions and the depositions were carried out under exactly the same conditions as in Examples 1 to 5. Only the distribution of fiber lengths of the graphite fibers was modified. In these Examples 6 to 11, at least 95% of the fibers had lengths equal to the mean value ±10%. This distribution, in contrast with the distributions commonly used for carrying out these depositions, enabled, in the case of graphite fibers, significant improvements to be achieved, as demonstrated by the results reported in the following Table II:

TABLE II

| | GRAPHITE FIBERS IN % | | | | | | Level of Stoppage (%) | Quality of the resulting deposit |
|---|---|---|---|---|---|---|---|---|
| Example | <1 | 1.25 mm | 1.5 mm | 1.75 mm | 2 mm | 2.5 mm | 3.0 mm | | |
| 6 | — | — | — | — | — | — | ≧95 | 86 | acceptable |
| 7 | — | — | — | — | — | ≧95 | — | 83 | homogeneous |
| 8 | — | — | — | — | ≧95 | — | — | 80 | homogeneous |
| 9 | — | — | — | ≧95 | — | — | — | 72 | homogeneous |
| 10 | — | — | ≧95 | — | — | — | — | 60 | homogeneous |
| 11 | — | ≧95 | — | — | — | — | — | 35 | some holes |

The deposition was regular and homogeneous over the entire range of fiber lengths. The level of stoppage decreased gradually and no longer abruptly, for fibers ≦ 2 mm. Moreover, the fraction of the solids recovered in the filtrates closely approximated that in the initial suspension, whereas in Examples 1 to 5 a significant decrease in the mean fiber lengths was observed. Under these conditions, the filtrates can be recycled practically as such, with no adverse change in the quality of the suspensions and the deposits.

Finally, and most importantly, these examples demonstrate a significant advantage of the invention which cannot be achieved according to the prior art.

One prior art difficulty is in the adjustment of the thickness of the conductive deposit, which should be small.

In the case of depositions onto hollow cathodes, the inner volume of which is significant (dead volume), and if the levels of stoppage are still ≧ 80%, the weight of the fibers deposited may be limited to a value less than that of the fibers contained in the volume of suspension which filled the dead volume of the cathode used, that is, not exceeding 80% of this value. This leads to minimum thicknesses which may be greater than the desired final values. In contrast, the present invention enables the thickness of the fibrous layer to be controlled by varying the level of stoppage.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A microporous composite comprising a deposit on a perforated rigid support substrate therefor, the deposit comprising a microporous material from a regular, homogeneous and consolidated deposit of monodispersed carbon fibers, said carbon fibers having a distribution by length such that the length of at least 80% of the individual fibers corresponds to the mean length of said fibers to within plus or minus 20%.

2. The microporous composite as defined by claim 1, the lengths of said fibers not exceeding the diameters of the perforations comprising said substrate.

3. The microporous composite as defined by claim 1, having a thickness of from 0.1 to 5 mm.

4. A cathode comprising the microporous composite as defined by claim 1.

5. An electrolytic separator comprising the microporous composite as defined by claim 1.

6. In a process for the electrolysis of sodium chloride in an electrolytic cell, the improvement which comprises utilizing as the cathodic element therefor, the microporous composite as defined by claim 1.

7. The microporous composite as defined by claim 1, including a consolidating amount of a binder for said fibers.

8. The microporous composite as defined by claim 7, further including asbestos fibers.

9. The microporous composite as defined by claim 1, wherein the deposit is formed by vacuum filtration of a suspension of the monodispersed carbon fibers, followed by consolidation of the deposit.

10. The process for the preparation of the microporous composite of claim 1, comprising depositing a suspension containing a binder and fibers on a perforated rigid substrate, wherein the fibers contain carbon fibers which have a length distribution such that the length of at least 80% of the fibers corresponds to the means length of fibers to within plus or minus 20%, and wherein at least a portion of the fibers are deposited on the substrate.

11. The process according to claim 10, wherein the process includes the step of recycling undeposited fibers to another depositing step.

* * * * *